United States Patent [19]

Carr

[11] 4,044,174
[45] Aug. 23, 1977

[54] ULTRASONICALLY SMOOTHING A MAGNETIC LAYER ON A WEB

[75] Inventor: David L. Carr, Rochester, N.Y.

[73] Assignee: Eastman Kodak Company, Rochester, N.Y.

[21] Appl. No.: 280,306

[22] Filed: Aug. 14, 1972

Related U.S. Application Data

[63] Continuation of Ser. No. 69,203, Sept. 3, 1970.

[51] Int. Cl.$^2$ .............................................. H01F 10/02
[52] U.S. Cl. ..................................... 427/130; 427/128
[58] Field of Search ..................... 117/237, 235, 64; 118/38, 57; 427/130, 128

[56] References Cited

U.S. PATENT DOCUMENTS

| | | | |
|---|---|---|---|
| 2,097,601 | 11/1937 | Potdevin | 117/119.4 |
| 2,200,155 | 5/1940 | Camp et al. | 156/43 |
| 2,252,345 | 8/1941 | Johnson | 117/64 |
| 2,522,082 | 9/1950 | Arnold | 264/22 |
| 2,778,744 | 1/1957 | Holt | 117/64 |
| 3,012,901 | 12/1961 | Reese | 118/57 |
| 3,023,123 | 2/1962 | Colwill et al. | 117/237 |
| 3,104,983 | 9/1963 | Tarwater et al. | 117/237 |
| 3,261,706 | 7/1966 | Nesh | 117/237 |
| 3,533,836 | 10/1970 | Messengale | 117/235 |
| 3,676,216 | 7/1972 | Abitboul | 117/237 |
| 3,817,785 | 6/1974 | Abitboul | 427/130 |

*Primary Examiner*—Bernard D. Pianalto
*Attorney, Agent, or Firm*—J. A. Matthews

[57] ABSTRACT

A layer of magnetic particles in a resin binder on a carrier is smoothed by effecting relative movement between the carrier and a vibrating ultrasonic horn having a surface in contact with the layer. The carrier can be a web of fully coated magnetic tape or of striped motion picture film; and can be passed over a solid metal anvil or can be drawn tautly over the horn without requiring an anvil. The horn can be perpendicular to the carrier for hammering the layer; or it can be essentially parallel to the surface of the carrier, and either transversely or longitudinally extending, for scrubbing the layer smooth. The smoothing procedure can also be performed while the carrier is immersed in a solvent for removing dirt particles. Advantageously the procedure is performed when the binder is fresh and less than fully cured; but it can also be performed by heating a resin binder to the desired plasticity before the smoothing operation.

9 Claims, 10 Drawing Figures

DAVID L. CARR
DEAN J. MacGREGOR
HENRY L. WEST
NEIL S. WHITE
INVENTORS

ATTORNEYS

ULTRASONICALLY SMOOTHING A MAGNETIC LAYER ON A WEB

This is a continuation of application Ser. No. 69,203 filed Sept. 3, 1970.

BACKGROUND OF THE INVENTION

1. Field of the Invention

The present invention relates to a novel method for smoothing a layer comprising magnetic particles in a binder carried on the surface of a suitable carrier such as a web of film or paper.

2. The Prior Art

Magnetic tape has been available for many years wherein a layer containing magnetic particles in a binder of a malleable polymeric resin is carried by a web of paper or film. Also it is well known to apply narrow stripes of similar magnetic compositions along the edges of motion picture film to provide the sound track. For improved frequency response and the greatest fidelity in recording and playing back sound it is desirable that the surface of the magnetic layer be extremely smooth and that the product be uniform in thickness, so as to assure the least gap between head and effective surface and to permit foundation of a tight uniform roll. Long recording head life also requires great smoothness.

In the past, efforts have been made to secure these desirable conditions by passing a magnetic tape or a striped film between metal polishing rollers after the coating step. While good results have been secured in this way, there are certain disadvantages to such a technique. For example, dirt frequently collects on the polishing rollers and causes polishing defects. Furthermore, such rollers are extremely expensive to manufacture and maintain because of the perfect cylindricity and the perfect surface polishing that are necessary. Morever, it is in some instances advantageous to heat the polishing rollers if the desired results are to be obtained.

SUMMARY OF THE INVENTION

In accordance with the present invention the disadvantages of the prior art are overcome by employing an ultrasonically vibrating horn having a surface in contact with the magnetic layer on a carrier, which together form a web such as magnetic tape or magnetically striped motion picture film. The vibrations cause the horn surface to pressure the magnetic layer to uniform smoothness, and the web to uniform thickness. Continuous relative movement is effected between the horn and the web during this ultrasonic polishing operation, either by moving the web past a stationary horn or by moving the horn over a stationary web.

Such an ultrasonic horn is relatively inexpensive to construct and maintain, and reduces to a minimum the possibility of polishing defects due to dirt accumulation. Moreover, such a vibrating horn need not be heated like polishing rollers.

THE DRAWINGS

THE PREFERRED EMBODIMENTS

Figure 1:
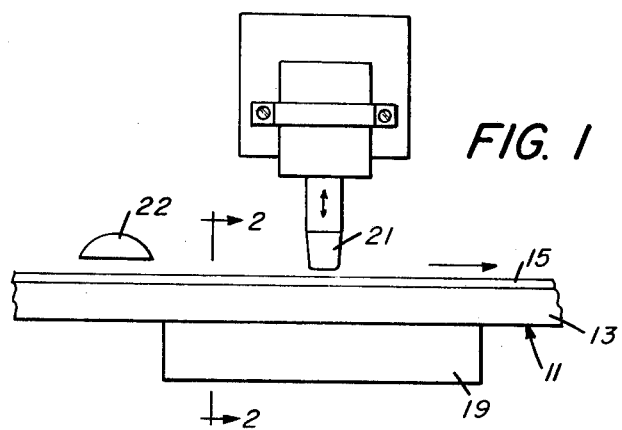
FIG. 1 is a schematic side elevational view showing an ultrasonic horn in position for polishing magnetically striped motion picture film as it moves across a stationary anvil.
Figure 2:
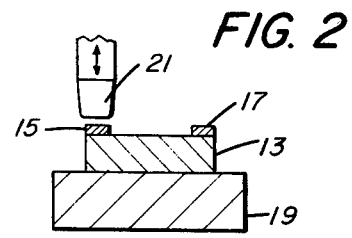
FIG. 2 is a cross sectional view taken along the line 2—2 in FIG. 1.

Referring to FIG. 1 and 2, a motion picture film 11 comprises a carrier 13 in the form of a long narrow web having a narrow edge stripe 15 of a malleable magnetic layer or coating in the form of magnetic particles of iron oxide or other media in a polymeric resin binder. A balancing stripe 17 of the same or different composition is carried on the opposite edge of the film. The film 11 is passed continuously along and in contact with the top surface of a metal or other solid anvil 19 and under the end surface of an ultrasonic horn 21 which is vibrating with ultrasonic speed in a direction perpendicular to the film to hammer the magnetic layer to a uniform smoothness and the film to uniform thickness. A conventional motor driven winding roll (not shown) moves the film along the anvil. The clearance between the end of horn 21 and the top surface of anvil 19 is adjusted accurately so that at its maximum excursion the horn reduces the thickness of the film to the desired value and causes any protruding magnetic particles to be driven into the binder, thus producing a super smooth surface on the magnetic layer.

While only one stripe 15 is shown as being polished since only one normally carries the sound recording, the balancing stripe 17 or additional other stripes also could be polished in the same way if desired as by using a separate horn for each stripe or by using a horn 21 with a surface wide enough to cover all such stripes simultaneously.

Normally it is not necessary to heat the film before polishing. If desired, however, a heater 22 such as an infrared heater can be operated ahead of the horn 21 to soften the binder.

Figure 3:
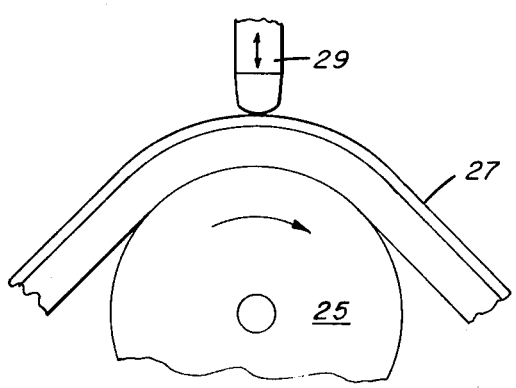
FIG. 3 is a schematic side elevational view of a modified form of apparatus wherein the film is passed over a rotating anvil during polishing.

Now referring to FIG. 3, an anvil in the form of a heavy metal roller 25 rotates to cause the film 27 to pass under a horn 29 which has a semicylindrical end surface and is vibrating perpendicular to the roller 25 at the point of contact (ie perpendicularly to a tangent). With this arrangement a magnetically striped film moving at 400 feet per minute has been polished with a transducer operating at 40 kHz and having a horn loaded against the film with a static force of 25–30 pounds. The end of the horn 29 was 0.65 × 0.65 inch and had a cylindrical curvature of 5 inches diameter. Anvil 25 had a diameter of 4 inches.

Figure 4:
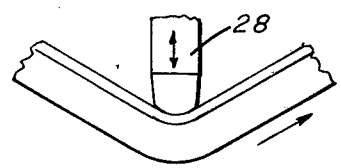
FIG. 4 is a schematic side elevational view of another modification of the invention wherein no anvil is employed.

FIG. 4 shows still another modification wherein no anvil is required because the motion picture film is bent tautly around the end of the horn 28 which is provided with a semi cylindrical surface for contact with the magnetic layer on the film. This operation is primarily for smoothing the magnetic layer and has little effect on total web thickness.

Figure 5:
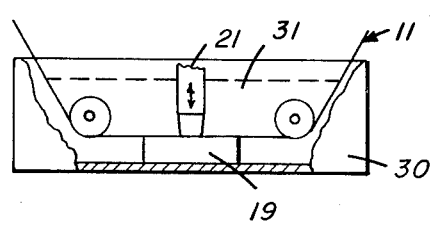
FIG. 5 is a schematic side elevational view, partly broken away and in section, showing apparatus similar to FIG. 1 in position for polishing a magnetic layer while submerged in a cleaning solvent.

In FIG. 5 there is shown apparatus similar to FIG. 1 but with the anvil 19 and the end of the horn 21 disposed within a tank 30 containing a suitable organic solvent cleaning liquid 31, which is not a solvent for the film or the binder, and is intended to remove dirt from the film or tape 11 as the magnetic layer is polished. Among suitable liquids are methyl chloroform, freons, dichlorodifluoromethane, monochlorotrifluoroethane, and dichlorotetrafluoroethane. This fluid can be continuously recirculated and filtered if desired.

Figure 6:
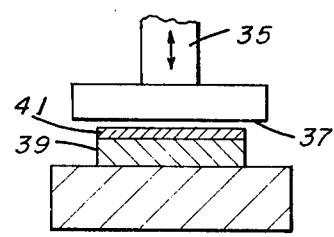
FIG. 6 is a cross sectional view similar to FIG. 2 showing an ultrasonic horn in position for polishing a fully coated magnetic tape.

FIG. 6 shows a horn 35 having an end surface 37 which is wide enough to polish the entire surface of a magnetic tape 39 whose entire surface is coated with magnetic particles carried in a binder to form a layer 41.

Figure 7:
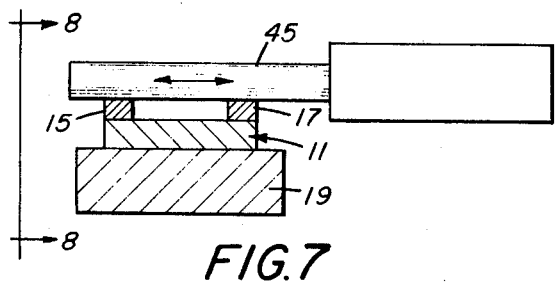
FIG. 7 is a schematic cross sectional view similar to FIG. 2 showing an ultrasonic horn in position for polishing magnetic stripes by a transverse scrubbing action.
Figure 8:
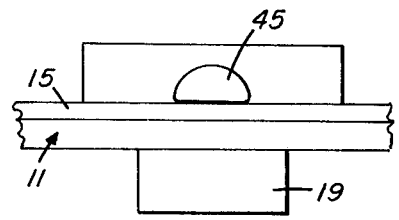
FIG. 8 is an end elevational view as seen from the line 8—8 in FIG. 7.

FIGS. 7 and 8 show both stripes on film 11 being polished by an ultrasonic horn 45 which is parallel to the film and is positioned transversely of the stripes, instead of perpendicularly, so that the longitudinal vibrations of the horn are parallel to the plane of the film and scrub the surfaces of the stripes 15 and 17 to produce the desired polishing effect.

Figure 9:
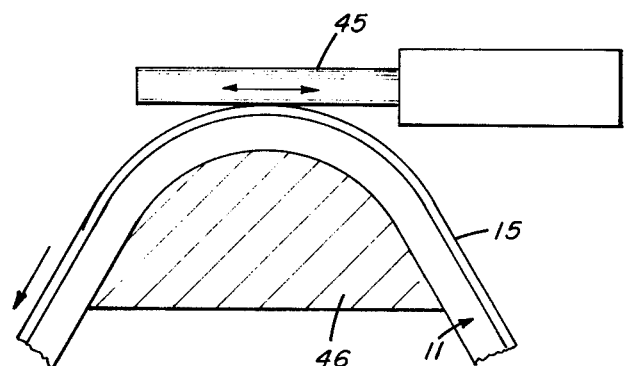
FIG. 9 is a side elevational view partly in section of an ultrasonic horn in position for scrubbing with a longitudinal action.

FIG. 9 shows the same ultrasonic horn 45 in position for scrubbing smooth a magnetic stripe 15 by vibrating longitudinally of the magnetic stripe as film 11 passes over a curved anvil 46 which can be either stationary or rotating. Horn 45 is parallel to the surface of the film, ie to a tangent at the line of contact.

Figure 10:
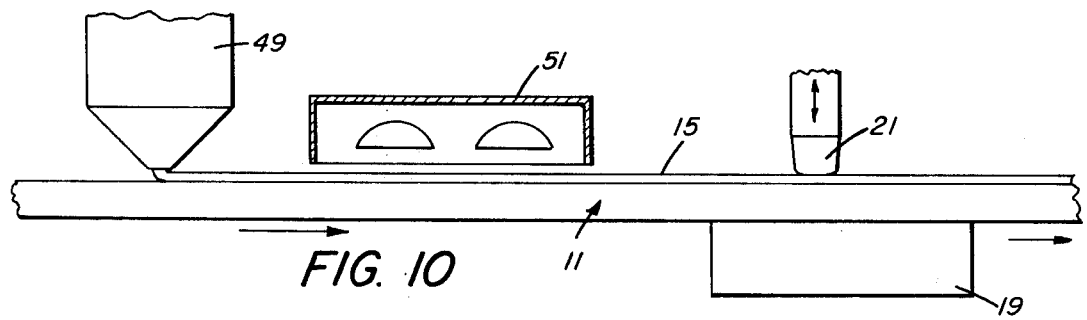
FIG. 10 is a schematic side elevational view showing an ultrasonic polishing apparatus in relation to the apparatus for coating and drying a magnetic layer on a web.

FIG. 10 shows the apparatus of FIG. 1 in relation to a coating hopper 49 and a drying zone 51 which causes the solvent to evaporate after the magnetic layer dispersed in a conventional solvent has been deposited on the film. This arrangement is particularly desirable since the best polishing results have been observed when the magnetic stripe or other magnetic layer is still fresh or "green" rather than fully hardened or cured.

The principles of the invention as described above can be applied to the polishing of stripes or full layers wherein the magnetic particles are held in any of the well known malleable polymeric thermoplastic or thermosetting resin binders which have been described in numerous patents. Some examples of suitable binders described in U.S. patents are as follows:

U.S. Pat. No. 2,937,028 — nylon
U.S. Pat. No. 2,956,970 — acrylic ester resins
U.S. Pat. No. 2,970,069 — alkylated urea formaldehyde or melamine formaldehyde
U.S. Pat. No. 3,419,420 — poly(vinyl acetal) e.g. butyral
U.S. Pat. No. 3,473,960 — vinylidene chloride - acrylonitrile + polyurethane
U.S. Pat. No. 3,490,946 — isocyanate-terminated polyester prepolymers Any of the well known carriers for magnetic layers may be used, such as poly(ethylene terephthalate), cellulose acetate, paper, or metal foil. These carriers may be unsubbed or may be provided with subbing layers upon which the magnetic coating is applied.

The magnetic particles may be any of the well known materials such as magnetic iron oxides, or magnetic chromium oxide; or metals such as iron, cobalt, nickel and alloys thereof with one another.

The ultrasonic horn may be any of the well known devices which are operated either magnetostrictively or piezoelectrically. A suitable device is described in U.S. Pat. No. 3,495,104. Such ultrasonic horns normally vibrate with very small amplitude such as 0.001 inch or less, and at frequencies as high as 20 to 40 kHz per second.

The invention has been described in detail with particular reference to the preferred embodiments thereof, but it will be understood that variations and modifications can be effected within the spirit and scope of the invention.

What is claimed is:

1. A method for smoothing a layer comprising magnetic particles in a binder on a carrier wherein said carrier is positioned in contact with a stationary anvil, said method comprising
effecting relative movement between said carrier and a vibrating ultrasonic horn having a vibrating surface in physical contact with said layer, causing said surface to pressure said layer to uniform smoothness.

2. A method in accordance with claim 1 wherein said binder is a resin which is less than fully cured.

3. A method in accordance with claim 1 wherein said horn is perpendicular to said carrier and hammers said layer to smoothness.

4. A method in accordance with claim 1, also comprising maintaining said carrier and horn within a pool of cleaning liquid.

5. A method in accordance with claim 1 wherein said horn is parallel to said carrier and scrubs said layer to smoothness.

6. A method in accordance with claim 1 wherein said carrier is a motion picture film, and said layer is a stripe of less width than said film.

7. A method in accordance with claim 1, also comprising heating said layer before contact with said horn.

8. A method in accordance with claim 1 wherein said carrier is a web, and said layer covers the surface thereof.

9. A method for smoothing a layer comprising magnetic particles in a binder on a carrier, said method comprising effecting relative movement between said carrier and a vibrating ultrasonic horn having a vibrating surface in physical contact with said layer, causing said surface to pressure said layer to uniform smoothness wherein said carrier moves over said horn with said layer in contact with said horn, and is otherwise unsupported adjacent said horn.

* * * * *